3,168,455
CORROSION PROTECTION
Paul Shapiro, Chicago, and Lawrence V. Collings, Steger, Ill., and Thomas O. Counts, Denver, Colo., assignors, by mesne assignments, to Sinclair Research, Inc., New York, N.Y., a corporation of Delaware
No Drawing. Filed Jan. 16, 1959, Ser. No. 787,111
8 Claims. (Cl. 204—147)

This invention is concerned with the protection of ferrous metal objects which are in contact with corrosive soil by the use of zinc, manganese and Group IIA metal arsenates. It has been found that the addition of small quantities of these arsenates to the soil in contact with a buried or partially buried ferrous object serves effectively to reduce corrosion due to materials in the soil. Also, the addition of these compounds to the soil surrounding buried ferrous objects which are under cathodic protection enables the current density of a cathodic protection system to be considerably reduced or even suspended for certain periods without undue corrosion of the metal. The method, therefore, effects considerable savings in the operating cost of a cathodic protection system.

Corrosion problems are particularly acute where large members, fabricated from ferrous metals, are in constant contact with soil, especially soil containing water. For example, oil pipelines and oil storage tank bottoms are continually subjected to alternating wet and dry environments wherein a water-air mixture can easily turn the metal to rust. Conventional methods of protecting the tanks, pipelines and other steel surfaces include coating the metal with various compositions to prevent access of the corrosive medium. Cathodic protection systems involve the use of a rectified electric current or sacrificial anodes—usually magnesium rods—to take the brunt of the oxidative effects of the corrosive medium. In the aqueous media concerned, magnesium atoms, being more electropositive than iron, have a greater tendency to dissolve in the medium as positively charged magnesium ions, leaving electrons on the remaining Mg metal and surrounding the free metal with an environment rich in positively charged Mg ions. By attracting negative ions through the aqueous medium the positively charged region around the Mg rod is effectively an anode. The excess electrons left on the Mg rod itself are conducted, by a lead, outside the ground, to the ferrous member which is to be protected. The dissolved oxygen and water, which react with each other according to the following equation when a supply of electrons is available:

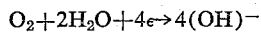

$$O_2 + 2H_2O + 4e^- \rightarrow 4(OH)^-$$

may secure these electrons from the supply conducted to the ferrous member, rather than from the iron itself by causing conversion of iron atoms to iron ions with consequent passage of these ions into solution and the familiar rusting, corrosion phenomenon. The excess electrons conducted to the ferrous member give this member a negative charge, making it a cathode and causing migration to the member of positive ions in the aqueous medium. In protecting a buried member by means of magnesium anodes, the anodes are usually sufficient to supply an output voltage of 1.6 to 1.7 volts potential referred to a Cu/CuCO$_4$ electrode, that is a potential of about 1 volt between the magnesium anode and the member to be protected.

The amount of current which flows to a given ferrous surface area at this E.M.F. is the current density of the system; the greater the current density which is supplied in a given circumstance, the quicker is the consumption of a given amount of magnesium. Alternatively, in place of the galvanic couple created by the association of the magnesium, for example, with the iron-base metal, an electric current may be applied to the steel member to give the steel a constant negative charge to prevent rusting. In this situation the effectiveness of the system for giving cathodic protection is usually determined by measuring the negativity of the cathode by means of a suitable half-cell, e.g., a Cu/CuSO$_4$ electrode. There is a lack of unanimity among authorities in cathodic protection as to what minimum steel-to-soil potential is needed for protection of a ferrous object. The most accepted figure is a minimum in the neighborhood of −0.77 volt to a calomel electrode or −0.85 volt to a Cu/CuSO$_4$ electrode. Most workers would consider −1.3 volts to a Cu/CuSO$_4$ electrode to be the highest voltage required, with −1.6 volts steel-to-soil potential as being wastefully high. The potential between anode and cathode is generally about 0.2 to 1.5 volts. The current density in either a rectified or sacrificial system is about the same, and is, of course, a measure of the energy put into the system, whether it be the mechanical energy of the generator or the chemical energy of the sacrificial anode. It is regulated by adjusting the speed of the generator or the size of the anode. The expense of generating power is necessarily a costly one and, by increasing shipping and storage charges, is reflected in the cost of products so handled, e.g., petroleum products. The use of magnesium sacrificial anodes is even costlier, although more convenient. In some circumstances it is more feasible to let the ferrous object rust and replace it rather than try to use cathodic methods of protecting it.

This invention provides a means whereby the cost of maintaining a charge on the corrodible pipeline, storage tank, etc., sufficient to prevent corrosion, may be drastically reduced, or corrosion of the member may be retarded without cathodic protection. The process of this invention provides the soil with an arsenate of zinc, manganese, a Group IIA metal or a mixture of these arsenates which enables the current requirement of the ordinary cathodic protection system to be drastically reduced, or which can form a protective coating on the corrodible metal without current. The current density applied in a cathodic protection system will frequently run as high as about 50 milliamperes per square foot. In the process of this invention current densities as low as about 0.5 ma./ft.$^2$ or lower are effectively used. The process is effective in reducing current requirements even when a very small quantity of the arsenate is mixed with or provided in the soil surrounding the object to be protected. The work involved in mixing the salt with the soil would dictate that a sufficient quantity of arsenate be used so that the savings on current would overbalance the labor cost. Also, although these compounds are only slightly soluble in water, rain will have some leaching effect on them. The addition of about 10 to 140 grams of arsenate per square foot of steel surface to be protected to the soil between the object and the anode appears to be the most practical range. With more than 100 g. of arsenate per square foot of surface, the current savings represented by additional quantities diminishes. Over 140 g. the leaching effect of rainfall is so great it may represent an uneconomical waste of the arsenates. Of course, local climatic and geological conditions are of importance in deciding just how much arsenate should be added to the soil at one time in order to maintain a small but effective quantity in the neighborhood of the ferrous object.

In performing the process of this invention the protective electric potential may be supplied by any suitable direct current source which is sufficient to maintain an adequate current density, e.g., a direct current generator, a rectified A.C. generator, storage batteries or by a galvanic couple with magnesium or other metal as the anode. The method of the invention may be used on metal which is already corroded.

The nature of the soil surrounding the ferrous object, including its pH, water content, drainage characteristics, etc., determines the corrosivity of the soil. An indication of this corrosivity is given by the soil resistivity of a sample of the soil, measured in ohms/cm.³. In each case, however, an individual determination can be made as to how much current is applied to the ferrous object from the anode in order to maintain the minimum potential to prevent appreciable corrosion. It has been found that when the process of this invention is used, progressively less current density is needed to maintain this potential. A cathodic protection system can be tested for effectiveness by determining whether a sufficient negative potential exists on the corrodible metal. In the process of this invention, before a protective coating is established on the corrodible metal more amperage is required to maintain this difference in potential. As the coating is gradually established, less current is required, until a level state is reached. A diminution in current requirements is accompanied by a decrease in energy input demand by the generator or less deterioration of a sacrificial anode. The following tests are illustrative examples of this process and are not to be considered as limiting its scope.

filled with coke breeze. Cathodes, representing the object to be protected were made from 4" x 9" (0.5 sq. ft. area) steel plates. Lead wires were connected in parallel between the anode and the cathodes by the Cadweld (thermite) process. The joints were coated to prevent galvanic corrosion between the steel and the weld metal.

Fifteen pounds of top soil were put in a burlap bag with each steel sample cathode. Samples B to K were made by distributing calcium, magnesium, zinc and manganese arsenates in varying amounts as evenly as possible in the bags containing the soil. The bags were then placed in their respective holes and soil was added to fill the holes and tamped to insure a well packed backfill. This produced cathodes buried in heavy soil four feet below the surface with major surfaces parallel to radii of the circle. At this depth the cathodes were below the water table. Current was supplied by a constant voltage D.C. power supply.

Although some anodes are capable of delivering an output voltage of 1.80–1.90 volts, 1.62 volts was selected for the output voltage of the rectifier in order to duplicate field installations which use conventional magnesium anodes having output voltages of about 1.6–1.7 volts. Thus, the results obtained are indicative of cathodic protection systems capable of producing about 1.6 volts or more. The plate to soil potential was measured by comparison with a copper/copper sulfate standard electrode. The results of this test, that is, the amperages used at the required protective potential are given in Table I in terms of concentration of arsenate in relation to the square feet of steel surface to be protected and the percent of arsenate in the 15-pound soil sample.

Tests were also conducted upon steel coupons protected with the water-soluble zinc chloride disclosed in copending application Serial No. 751,867, filed July 30, 1958, now U.S. Patent No. 3,091,580, using the same procedure but a different part of the test field. These are samples L–N of Table I. Samples O and P were also tested in this second test field.

Table I

| Sample | Additive | Concentration | | Weeks in Operation | Plate to Soil Potential (Volts) (Cu/CuSO₄ reference cell) | Current Density, ma./sq. ft. | Percent Decrease in Current Density |
|---|---|---|---|---|---|---|---|
| | | Grams/sq. ft. | Percent | | | | |
| A | Blank [1] | | | 10 | −0.99 | 3.68 | |
| B | Ca arsenate | 35.0 | 0.25 | 10 | −0.98 | 1.40 | 62.0 |
| C | do | 70.0 | 0.50 | 10 | −0.98 | 1.94 | 47.2 |
| D | do | 140.0 | 1.00 | 10 | −0.99 | 1.22 | 66.9 |
| E | Mg arsenate | 35.0 | 0.25 | 10 | −0.99 | 2.42 | 34.2 |
| F | do | 70.0 | 0.50 | 10 | −0.99 | 1.97 | 46.5 |
| G | do | 140.0 | 1.00 | 10 | −1.00 | 0.89 | 75.6 |
| H | Zn arsenate | 35.0 | 0.25 | 10 | −0.99 | 2.50 | 32.1 |
| I | do | 70.0 | 0.50 | 10 | −0.99 | 0.94 | 74.5 |
| J | do | 140.0 | 1.00 | 10 | −0.99 | 0.86 | 76.6 |
| K | Mn arsenate | 70.0 | 0.50 | 10 | −1.00 | 1.11 | 70.0 |
| L | Blank [1] | | | 16 | −1.06 | 2.44 | |
| M | CaMoO₄ | 200.0 | 1.47 | 16 | −1.06 | 1.73 | 29.1 |
| N | ZnCl₂ | 136.0 | 1.00 | 16 | −1.05 | 1.80 | 26.2 |
| O | Ca arsenate | 199.0 | 1.46 | 16 | −1.06 | 0.95 | 61.0 |
| P | Mg arsenate | 156.0 | 1.20 | 16 | −1.01 | 1.12 | 54.1 |

[1] Average of several blanks spaced evenly throughout test circles.

FIELD TESTS

To determine the effectiveness of salts added to tthe soil around buried steel objects, several series of experiments were performed. The test area consisted of a field wherein the first 3.5 feet of topsoil was of a clayey nature consisting of fill over a swamp. The soil resistivity in the topsoil averaged 1875 ohms/cm.³, but this is not necessarily a true indication of the resistivity of the swamp soil in which the samples were partially buried. Nineteen holes 8" in diameter and 4 feet deep were dug in the test field. Eighteen of these were in a circle 30 feet in diameter, approximately 5 feet apart. The other hole was at the center of the circle. Six inches of coke breeze were placed in the center hole, and an anode consisting of a steel pipe 3 feet in length was then lowered into the hole. The hole was then completely It is thus seen that the arsenates of zinc, magnesium and the Group IIA metals are highly effective in reducing current demand in the cathodic protection of buried steel members when added to the soil around these members, and that salts of the same metals containing different anions are not so effective in the same quantities.

SOIL TESTS CONDUCTED IN LABORATORY

Although at the start of the field tests many of the salts mentioned above were effective in reducing current demand for buried steel under cathodic protection, the question arose as to whether these salts would be corrosive to the steel if there were no protective current, i.e., if the current was interrupted for a period of time. To answer this question a laboratory test was devised.

To a series of uncovered one quart, wide-mouthed jars, 900 grams of the top soil used in the field tests were added. Evenly distributed throughout the soil was 2% by weight (18 grams) of the beneficial salt. The earth in each jar was saturated with 450 ml. of tapwater. In the center of these soil-filled jars were placed weighed steel coupons which were completely covered by the soil-tapwater-salt mixture. By weighing the jars at the start of the test any evaporation losses were made up by adding tapwater periodically. Tests were run in duplicate. Coupons were cleaned and weighed after the test period to determine corrosion rate. Results are given in Table II.

rounded the plate area for drainage. The plates were left under cathodic protection for several weeks. After this period the plates were lifted from their sites by means of a lift tractor. Under plate "A," tapwater was placed evenly on the topsoil fill. Under plate "B" a slurry of 1120 grams of calcium arsenate in tapwater was spread as evenly as possible on the topsoil fill. Under plate "C" a slurry containing 2240 grams of calcium arsenate in tapwater was placed evenly on the topsoil fill. After placing the water and chemical on the topsoil fill the plates were lowered back to their sites.

*Table II*

| Test No. | Chemical | Conc., Percent | No. Days | Weight Loss, g. | Corrosion Expressed as mg./dm.$^2$/day | Average, mdd. | Percent Reduction in Steel Loss |
|---|---|---|---|---|---|---|---|
| 1A | Blank | | 65.3 | 0.6177 | 13.2 | 12.9 | |
| 1B | | | 64.1 | 0.5794 | 12.6 | | |
| 2A | MnSO$_4$·H$_2$O | 2 | 66.0 | 0.5761 | 12.3 | 11.0 | 14.7 |
| 2B | | | 64.1 | 0.4418 | 9.6 | | |
| 3A | ZnCl$_2$ | 2 | 66.0 | 0.4041 | 8.50 | 9.04 | 30.0 |
| 3B | | | 64.1 | 0.4459 | 9.66 | | |
| 4A | Magnesium Arsenate | 2 | 66.0 | 0.3301 | 6.95 | 7.35 | 43.0 |
| 4B | | | 64.1 | 0.3578 | 7.75 | | |
| 5A | Calcium Arsenate | 2 | 66.0 | 0.1990 | 4.18 | 4.21 | 67.4 |
| 5B | | | 64.1 | 0.1950 | 4.23 | | |

These soil tests, conducted in the laboratory, indicate that the chemicals added to the soil in the field test will be beneficial even in the absence of a protective current. Calcium and magnesium arsenates appear to be quite effective rust inhibitors.

SIMULATED STORAGE TANK BOTTOM TESTS

The corrosion of the underside of petroleum storage tanks is a widespread problem. To mitigate this, cathodic protection of tank bottoms has been practiced for some time; for example, anodes have been installed around the periphery of a tank bottom. While these may adequately protect for a reasonable distance in from the outer circumference of the bottom, there usually is some difficulty in extending protective current in to the middle of the tank. One partially successful solution to this problem has been to install anodes in a slanting hole dug from the outer periphery, slanting toward the center and extending many feet below the bottom. Even this procedure, however, has failed to supply an adequate plate to soil potential near the center of the tank bottom, and the price of maintaining this type of protection is relatively high. The addition of arsenates to the fill on which the tanks rest reduces this price. Calcium arsenate is economical and field tests have shown that it increases the resistance and potential drop between earth and the metal surface. As a result, available protective currents are spread to surfaces further from the anode. To determine whether this chemical would be effective on storage tank bottoms, tests were set up to simulate field conditions.

Three 0.5 inch thick steel plates 4 feet by 8 feet were placed about 20 feet from each other in a flat area consisting of black topsoil—the same kind of topsoil used to fill the bags in the buried steel tests. The plates were connected through separate variable resistors to individual galvomag anodes buried 4 feet beneath the ground. The plates were connected to the anode leads by the Cadweld process. All joints were coated. On each plate was loaded 6 oil drums containing sand having a combined weight of about 4,500 lbs. A ditch sur- Table III shows the decrease in current obtained when these arsenates are used. The plate to soil potential was measured by means of a Cu/CuSO$_4$ electrode.

*Table III*

Plate A = blank
Plate B = calcium arsenate, 35.0 grams/sq.ft. of steel surface
Plate C = calcium arsenate 70.0 grams/sq. ft. of steel surface

| No. of Wks. of Test Operation | Plate | Aver. Plate to Soil Potential | Cur. Den. ma./sq. ft. | Percent Current Decr. Compared to Blank |
|---|---|---|---|---|
| 2 | A | −1.03 | 1.32 | |
| | B | −1.00 | 0.96 | 27.3 |
| | C | −1.02 | 0.72 | 45.5 |
| 3 | A | −1.06 | 0.88 | |
| | B | −1.06 | 0.63 | 28.4 |
| | C | −1.06 | 0.36 | 59.1 |
| 8 | A | −0.94 | 0.78 | |
| | B | −0.94 | 0.18 | 76.8 |
| | C | −0.94 | 0.33 | 57.0 |

In actual practice, three methods could be used in protecting tank bottoms. The first consists of spreading an arsenate powder or an aqueous arsenate slurry on the ground before construction of the tank bottom, fabricating and placing the tank bottom, and applying enough current to maintain a negative electromotive potential between the steel plates and the underlying soil. A second method of reducing the current required to cathodically protect from corrosion the underside of a tank bottom resting on the ground consists of pumping a slurry of an arsenate under the tank bottom after it is in place; or it may be desirable to protect the underside of tanks resting on soil or rock fill by emptying the tank, drilling a hole in the bottom plate and pumping an aqueous slurry of an arsenate between the steel bottom and the underlying soil, sealing the tank bottom and returning it to service.

It can therefore be seen from the results shown that the provision of zinc, manganese or group IIA metal (Ca, Mg, Ba or Sr) arsenates in the soil around buried ferrous objects significantly reduces the corrosion of these objects and, when the objects are cathodically protected, greatly reduces the amount of current at the protecting voltage on the objects.

We claim:
1. In a cathodic protection system for reducing corrosion of a ferrous metal object in contact with soil the step which comprises providing in the soil adjacent to said object a small but effective quantity of an arsenate of a metal selected from the group consisting of zinc, manganese and the group IIA metals to reduce the current requirements of said cathodic protection system.
2. The process of claim 1 where the arsenate is provided in a quantity of about 10 to 140 grams per square foot of ferrous surface to be protected.
3. The process of claim 1 where the arsenate is calcium arsenate.
4. The process of claim 2 where the cathodic protection system provides a current density of about 0.5 to 50 milliamperes per square foot through the soil between the anode and the ferrous metal object.
5. The process of claim 4 where the arsenate is zinc arsenate.
6. The process of claim 4 where the arsenate is calcium arsenate.
7. The process of claim 4 where the arsenate is magnesium arsenate.
8. The process of claim 4 where the arsenate is manganese arsenate.

References Cited in the file of this patent
UNITED STATES PATENTS

| | | |
|---|---|---|
| Re. 16,331 | Goodwin | Apr. 20, 1926 |
| 2,428,526 | Osterheld | Oct. 7, 1947 |
| 2,444,174 | Tarr et al. | June 29, 1948 |
| 2,601,214 | Robinson | June 17, 1952 |
| 2,678,291 | Spruance et al. | May 11, 1954 |
| 2,839,462 | Nelson | June 17, 1958 |
| 2,979,377 | Hitzman et al. | Apr. 11, 1961 |
| 3,001,919 | Petrockino | Sept. 26, 1961 |

OTHER REFERENCES

Watts: "Bulletin of University of Wisconsin, EESS No. 83," pages 12–13, 1938.

Oppenheimer: World Oil, December 1958, pages 144–147.